(12) United States Patent
Trager et al.

(10) Patent No.: US 10,226,153 B2
(45) Date of Patent: Mar. 12, 2019

(54) DRINK CONTAINER

(71) Applicant: Fresh Twist LP, Los Angeles, CA (US)

(72) Inventors: Craig M. Trager, Los Angeles, CA (US); Chad Donella, Studio City, CA (US); Stuart Long, Camarillo, CA (US)

(73) Assignee: Fresh Twist, LP, Los Angeles, CA (US)

( * ) Notice: Subject to any disclaimer, the term of this patent is extended or adjusted under 35 U.S.C. 154(b) by 20 days.

(21) Appl. No.: 14/927,154

(22) Filed: Oct. 29, 2015

(65) Prior Publication Data

US 2016/0066749 A1 Mar. 10, 2016

Related U.S. Application Data

(63) Continuation-in-part of application No. 13/969,082, filed on Aug. 16, 2013, now abandoned.

(51) Int. Cl.
| | |
|---|---|
| *B01F 13/00* | (2006.01) |
| *A47J 43/27* | (2006.01) |
| *B65D 81/32* | (2006.01) |
| *B65D 25/04* | (2006.01) |
| *B65D 25/08* | (2006.01) |
| *C12G 3/04* | (2019.01) |
| *B01F 15/00* | (2006.01) |
| *B01F 15/02* | (2006.01) |

(Continued)

(52) U.S. Cl.
CPC ......... *A47J 43/27* (2013.01); *B01F 15/00512* (2013.01); *B01F 15/0212* (2013.01); *B01F 15/0224* (2013.01); *B65D 25/04* (2013.01); *B65D 25/08* (2013.01); *B65D 81/3211* (2013.01); *B65D 81/3283* (2013.01); *C12G 3/04* (2013.01); *B65D 7/04* (2013.01); *B65D 11/04* (2013.01); *B65D 13/02* (2013.01); *B65D 15/02* (2013.01)

(58) Field of Classification Search
USPC .................................. 206/219, 221; 366/130
See application file for complete search history.

(56) References Cited

U.S. PATENT DOCUMENTS

| | | |
|---|---|---|
| 4,779,722 A | 10/1988 | Hall |
| 5,482,170 A | 1/1996 | Semersky et al. |
| 5,794,819 A | 8/1998 | Smith |

(Continued)

FOREIGN PATENT DOCUMENTS

| | | |
|---|---|---|
| WO | 97/13690 A1 | 4/1997 |
| WO | 2004/005155 A1 | 1/2004 |

*Primary Examiner* — Jacob K Ackun
(74) *Attorney, Agent, or Firm* — Plumsea Law Group, LLC

(57) ABSTRACT

The disclosure is directed to a drink container that includes a lower container having a void formed therein configured to hold a liquid, a divider disposed in the void of the lower container, the divider configured to form a plurality of compartments, each compartment being configured to separately hold a liquid, wherein each of the compartments has an open top portion, a film configured to seal the top portions of each of the plurality of compartments, a upper container configured to interact with the lower container and a cutter, the cutter being operably attached to an internal surface of the upper container at a first end, wherein a cutting edge of the cutter is nearer the film than the first end of the cutter.

8 Claims, 3 Drawing Sheets

(51) Int. Cl.
*B65D 8/00* (2006.01)
*B65D 13/02* (2006.01)

(56) References Cited

U.S. PATENT DOCUMENTS

| | | |
|---|---|---|
| 6,148,996 A | 11/2000 | Morini |
| 6,450,351 B1 | 9/2002 | Thompson |
| 7,331,478 B2 | 2/2008 | Aljadi |
| 8,646,966 B2 | 2/2014 | Marino et al. |
| 2002/0179461 A1 | 12/2002 | Mollstam et al. |
| 2006/0108363 A1 | 5/2006 | Yates, III |
| 2007/0029275 A1 | 2/2007 | Hantman et al. |
| 2007/0267416 A1 | 11/2007 | Eichenbaum |
| 2008/0078200 A1 | 4/2008 | Roth et al. |
| 2008/0124432 A1* | 5/2008 | Ma .................... B65D 41/3428 426/115 |
| 2008/0314775 A1 | 12/2008 | Owoc |
| 2010/0140203 A1 | 6/2010 | Kountotsis |
| 2010/0206174 A1 | 8/2010 | Loden |
| 2010/0315897 A1 | 12/2010 | Renna et al. |
| 2011/0266170 A1* | 11/2011 | Ligon ................. B65D 81/3211 206/219 |
| 2011/0272302 A1 | 11/2011 | Pagan |
| 2012/0024812 A1 | 2/2012 | Underwood |
| 2013/0126369 A1* | 5/2013 | Gamelli ................ B65D 43/02 206/217 |
| 2014/0097106 A1* | 4/2014 | Broekaert ............. B65D 25/08 206/222 |
| 2015/0027913 A1* | 1/2015 | P. J. ................. B65D 81/3211 206/222 |
| 2015/0050405 A1 | 2/2015 | Trager et al. |

* cited by examiner

DRINK CONTAINER

CROSS REFERENCE TO RELATED APPLICATIONS

This application is a continuation-in-part of U.S. patent application Ser. No. 13/969,082, filed Aug. 16, 2013, the entire contents of which are incorporated herein by reference.

FIELD OF THE DISCLOSURE

The present invention relates generally to single-use drink containers. More specifically, the present invention relates to a single-use mixed drink containers having multiple individually isolated compartments.

SUMMARY OF THE DISCLOSURE

The disclosure is directed to a drink container that includes a lower container having a void formed therein configured to hold a liquid, a divider disposed in the void of the lower container, the divider configured to form a plurality of compartments, each compartment being configured to separately hold a liquid, wherein each of the compartments has an open top portion, a film configured to seal the top portions of each of the plurality of compartments, a upper container configured to interact with the lower container and a cutter, the cutter being operably attached to an internal surface of the upper container at a first end, wherein a cutting edge of the cutter is nearer the film than the first end of the cutter.

BRIEF DESCRIPTION OF THE DRAWINGS

These and other features, aspects, and advantages of the present disclosure will become better understood with regard to the following description, appended claims, and accompanying drawings wherein:

DETAILED DESCRIPTION OF DISCLOSURE

Figure 1:
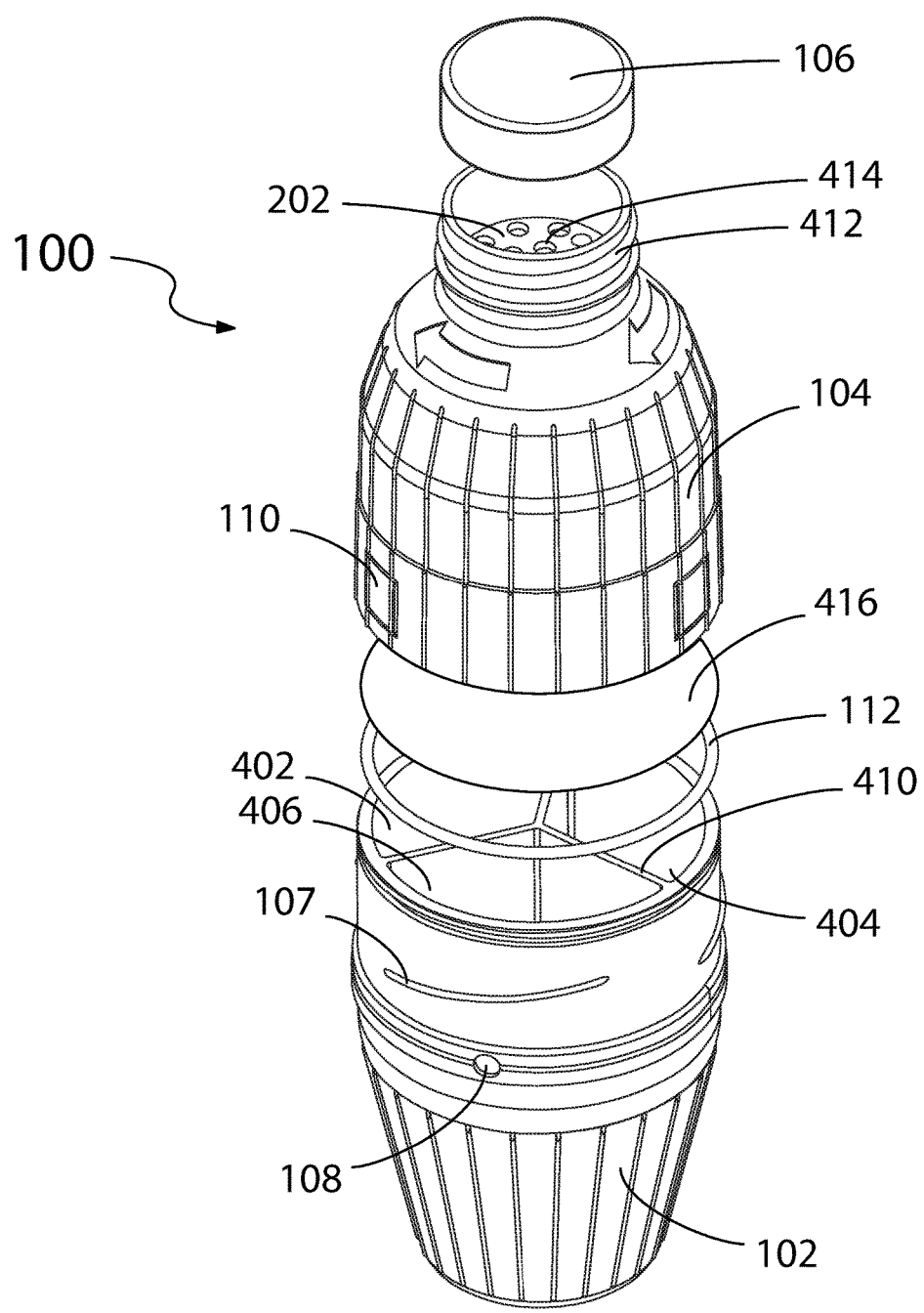
FIG. 1 is an exploded view of an embodiment of the present disclosure.

With reference to FIG. 1-4, an embodiment of the present disclosure is a drink container 100 that includes a lower container 102. FIG. 1 is an exploded view of drink container 100. An upper container 104 is configured to screwably couple with the lower container 102. Additionally, the upper container 104 includes a cap 106. The vertical grooves shown on the exterior of lower container 102 and upper container 104 can enhance a user's grip but in other embodiments no grooves can be provided or different configurations of grooves can be provided.

The upper container 104 also includes an upper orifice 414 and a surrounding lip 412 dimensioned to receive the cap 106. The cap 106 may be configured with threads on an internal perimeter surface corresponding to threads formed on an outside perimeter surface of the lip 412, or cap 106 and lip 412 can sealably be pressed together. Additionally, a film (not shown) may be provided as a tamper-proof seal across the upper orifice 414.

The outer surface of the lower container 102 includes one or more threads 107, one of which is shown in FIG. 1. These one or more threads 107 are configured to interact with a different thread on the interior surface of upper container 104 (discussed below). The one or more threads 107 can be either a male thread or a female thread, with the thread on the interior surface of upper container 104 being the opposing thread.

Figure 2:
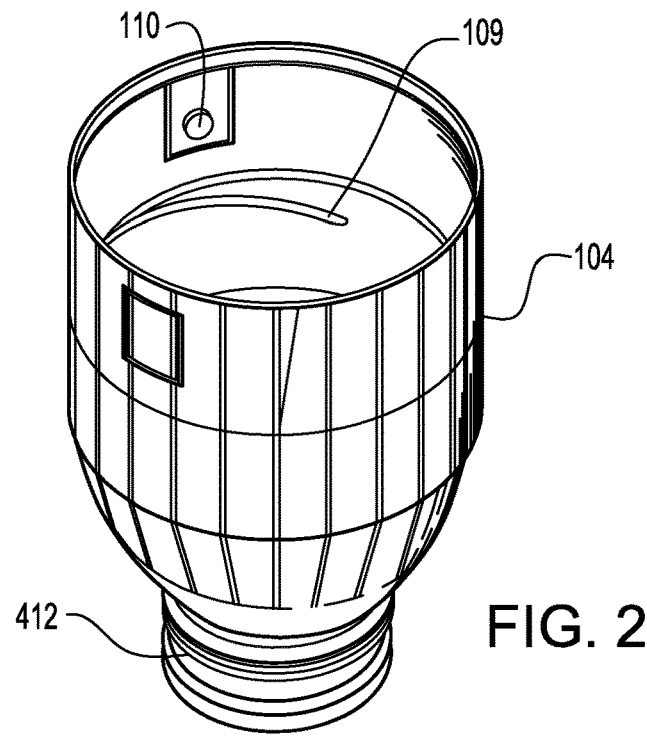
FIG. 2 is a perspective view of the upper container.
Figure 3:
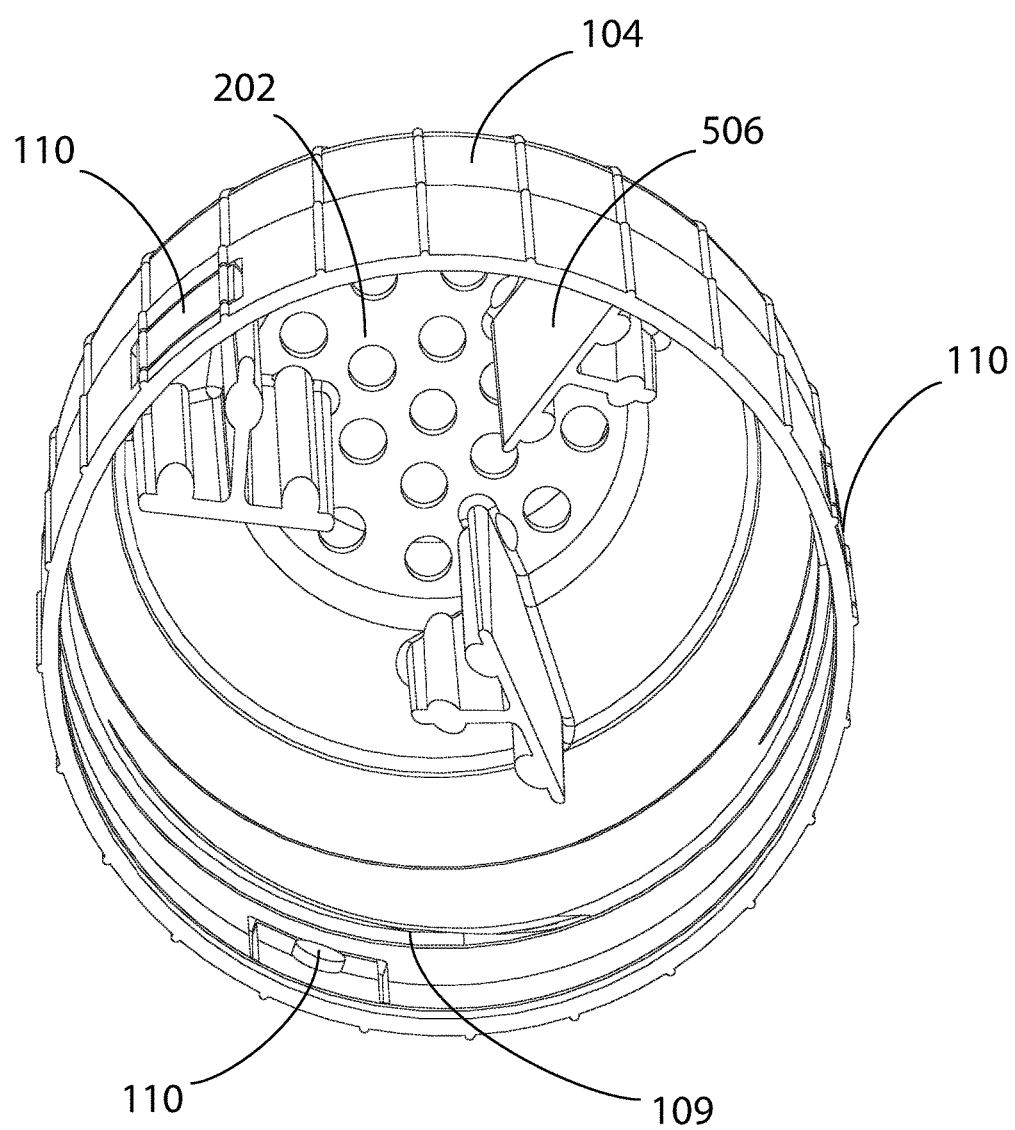
FIG. 3 is a perspective view of the upper container.

As shown in FIGS. 1-3, upper container 104 may include a pouring end and a rim disposed opposite the pouring end. The rim may define an open end of upper container 104. Upper container 104 may include threads 109 disposed on an interior surface of upper container 104. As shown in FIG. 2, upper container 104 may include tabs 110 extending from the inner surface of upper container 104 and disposed between threads 109 and the first rim. As shown in FIG. 2, threads 109 may be disposed between the pouring end and tabs 110. The outer surface of the lower container 102 also has one or more openings 108 configured to accept tabs 110 disposed along a lower perimeter of the upper container 104, such that at least a portion of the tab 110 becomes located within the opening 108. One opening 108 and one tab 110 are shown in FIG. 1, but other views of the container illustrate more than one opening 108 and more than one tab 110. Tabs 110 may be configured to be secured within openings 108. Once the tabs 110 are secured within the openings 108, the upper container 104 is not easily removable from the lower container 102 by rotating the upper container in either a counter-clockwise or clockwise direction. As shown in FIG. 1, thread 107 may be disposed on the outer surface of lower container 102 between the rim and openings 108.

Rotation of the upper container 104 in one of a counter-clockwise or clockwise direction causes thread 107 to cause the upper container 104 to move towards the lower container 102 until the one or more tabs 110 enters the one or more openings 108.

An interior of upper container 104 is shown in FIG. 2. As can be seen from FIG. 2, threads 109 are configured to mate with threads 107 (shown in FIGS. 1 and 4) of the lower container. In this view of upper container 104 tab 110 is shown as being circular, but, in other embodiments tab 110 can be any suitable shape that corresponds with opening 108 (shown in FIG. 1) of lower container 102.

Referring again to FIG. 1, an interior void of the lower container 102 is defined by an interior surface and divided by one or more dividers 410 configured to partition the interior void into a plurality of compartments, for example, compartments 402, 404 and 406. In this embodiment lower container 102 includes three compartments, but in other embodiments, lower container can include one compartment, two compartments, four compartments or more. The compartments 402, 404 and 406 form segregated liquid holding regions that are sealed from one another. Accordingly, compartments 402, 404 and 406 may be configured to separately hold a liquid. Compartments 402, 404 and 406 may each include an open portion. As shown in FIG. 1, lower container 102 may have a rim defining at least part of each of the open portions. Lower container 102 may include an outer surface that is opposite the interior surface of lower container 102.

FIG. 1 illustrates an embodiment of drink container 100 in which each compartment of the plurality of compartments 402, 404 and 406 appear to have similar or the same volumes, in other embodiments the compartments can have differing volumes and/or shapes as compared to each other.

For example, the plurality of compartments 402, 404 and 406 may be of different volumes. The volumes of the individual compartments 402, 404 and 406 may be made different by forming a baffled bottom at an appropriate height within the compartments 402, 404 and 406, thus each of the plurality of compartments 402, 404 and 406 has different depths. Alternatively, the one or more dividers 410 may be oriented such that the compartments 402, 404 and 406 have different cross-sectional areas. Furthermore, the divider 410 may be formed of other shapes instead of the Y-shape shown in FIG. 1. The divider 410 may have curved shapes for example.

Drink container 100 also can include a strainer 202, a gasket 112 and a film 416. Strainer 202 is disposed at the pouring end of upper container 104 and is configured to allow a liquid to pass through the upper orifice 414, through a plurality of holes of strainer 202, which deter passage of solids such as ice. The upper orifice 414 disposed at a top surface of the upper container 104 and allows for liquid inside the drink container 100 to pass through the strainer the strainer 202 when the upper container 104 is coupled with the lower container 102.

Gasket 112 can be placed between the lower container 102 and the upper container 104 to aid in avoiding liquids from exiting or entering drink container 100. Film 416 may be configured to maintain a seal over the open portions of compartments 402, 404 and 406. Film 416 is formed of any suitable material that can suitably maintain a seal between compartments 402, 404 and 406 and the upper container 104, such as a metallic or plastic material, and the suitable material of film 416 is configured to be pierced manually, as discussed below. Although FIG. 1 illustrates an exploded view of drink container 100, during use film 416 is configured to be positioned along the upper periphery of lower container 102 such that it contacts the upper periphery and one or more dividers 410.

A mixing void is formed between the surface of film 416 and the interior surface of upper container 104, including strainer 202, this mixing void provides a volume for intermixing the contents of the lower container 102. Upper container 104 includes an outer surface that is opposite the interior surface of lower container 102.

An interior of upper container 104 is also shown in FIG. 3. Each cutter 506 is operably attached to the interior of upper container 104. The proximal portions of each cutter 506, as illustrated in FIG. 3, are configured to contact and pierce film 416 (not shown) to form an opening in film 416, in a portion covering each of compartments 402, 404 and 406. In the embodiment shown in FIG. 3 there are three cutters 506 because there are three compartments 402, 404 and 406 of FIG. 1. But, the number of cutters 506 like the number of compartments 402, 404 and 406 can be changed and be one cutter, two cutters, four cutters or more.

The cutters 506 are caused to pierce film 416 as the top container 104 is rotated and thread 109 interacts with thread 107 of the lower container 102 (not shown). The cutters 506 are radially disposed about the upper container 104 at positions configured to pierce portions of film 416 covering each of compartments 402, 404 and 406 upon rotation of upper container 104.

In the shown embodiment, the cutters 506 are formed as generally T-shaped and have a sloped bottom surface. However, alternative shapes may be used as well, such as any shape configured to form a hole in film 416.

Figure 4:
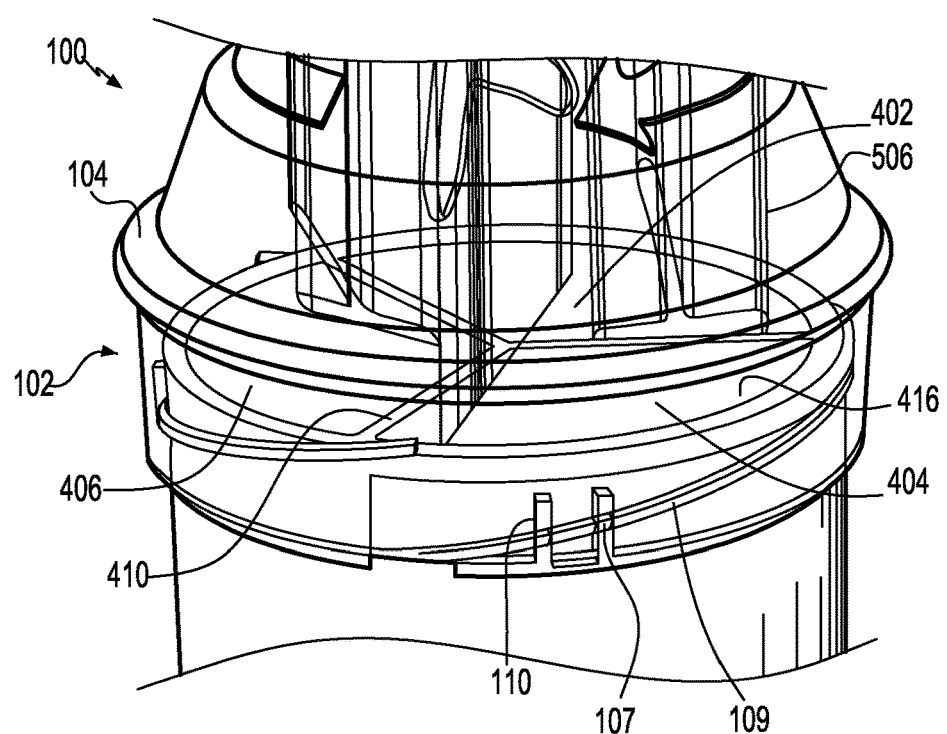
FIG. 4 is a perspective view of the upper container and lower container.

Another view of a portion of drink container 100 is shown in FIG. 4. In this illustration the tab 110, film 416, upper container 104 and cutters 506 are shown as substantially transparent. In this embodiment, as upper container is rotated in a clockwise direction, threads 107 and threads 109 interact with each other and cause the cutters 506 and the upper container 102 to move toward film 416. As the upper container 102 continues to rotate, a cutting edge of the cutters 506 continues to get closer to film 416 until film 416 is pierced and a hole is formed by each of the cutters 506. As shown in FIG. 3, each of the cutters 506 may have a flat leading edge extending radially from a center of upper container 104. In this embodiment the flat leading edge of each of the cutters 506 allows for a sufficiently sized hole as the upper container continues to rotate after each of the cutters 506 contacts film 416.

In a storage configuration the cutters 506 are located at a non-contact distance and vertically separated from contact with the film 416. However, as the upper container 104 is rotated with respect to the lower container 102, the cutters 506 are brought into contact with and pierce film 416, forming openings in the film 416. Continued rotation of the upper container 104 causes the cutters 506 to tear the film 416 for each of the plurality of compartments 402, 404 and 406, thereby causing the plurality of compartments 402, 404 and 406 to be unsealed at substantially the same time.

Once the film 416 includes a hole for each of the plurality of compartments 402, 404 and 406, the drink container 100 can be shaken to mix the liquids from each of compartments 402, 404 and 406 together in a void formed between the top of the lower container 102 and a bottom surface of the strainer 202. After the container 100 is shaken sufficiently to mix the liquids contained therein, the cap 106 can then be removed and the contents of the drink container 100 can be poured into an appropriate drinking glass, with or without ice.

Some non-limiting examples of specific drinks that can be created with drink container 100 are discussed below. In other embodiments the proportions of each ingredient and the configuration of drink container 100 can be modified as desired.

Example 1—Sea Breeze

In a first example, a single portion of a sea breeze is described implemented in the drink container 100 of the present disclosure. The recipe for a sea breeze is as follows:
1 part vodka;
1 part grapefruit juice; and
3 parts cranberry juice.

Consequentially, the compartments of the lower container 102 are dimensioned to hold about 40 ml of vodka in a first compartment 402, about 40 ml of grapefruit juice in a second compartment 404, and about 120 ml of cranberry juice in a third compartment 406.

Other cocktails may be implemented with the present disclosure using any number of alcoholic and non-alcoholic liquids. Alcoholic liquids may be vodka, gin, rum and tequila, for example. Non-alcoholic liquids may be juices, carbonated liquids and syrups, for example.

The drink container 100 of the present disclosure can be implemented as a disposable container manufactured of any suitable material, including materials, such as plastic, metal, and glass. Additionally, various materials may be used in combination, such as a glass lower container 102, metal upper container 104 and.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A drink container comprising:
   a first container having:
     a first interior void defined by a first interior surface;
     a first outer surface that is opposite the first interior surface;
     a strainer disposed at a pouring end, wherein the strainer includes at least one hole configured for liquid to pour through the at least one hole;
     a first rim disposed opposite the pouring end and defining an open end of the first container;
     at least one cutter extending from the first interior surface;
     at least one first container thread disposed on the first interior surface;
     at least one tab extending from the first inner surface and disposed between the at least one first container thread and the first rim, wherein the at least one first container thread is disposed between the pouring end and the at least one tab;
   a second container having:
     a second interior void defined by a second interior surface;
     a second outer surface that is opposite the second interior surface;
     a divider partitioning the second interior void into a first compartment and a second compartment, wherein the first compartment and the second compartment are each configured to separately hold a liquid and wherein the first compartment includes a first open portion and the second compartment includes a second open portion;
     a second rim defining a part of both the first open portion and the second open portion;
     at least one opening disposed on the second outer surface, wherein the at least one tab has a shape corresponding to the at least one opening and wherein the at least one tab is configured to be secured within the at least one opening;
     at least one second container thread disposed on the second outer surface between the second rim and the at least one opening, wherein the at least one second container thread is configured to mate with the at least one first container thread;
   a film configured to maintain a seal over the first open portion and the second open portion, wherein, in a storage configuration, the at least one cutter is spaced apart from the seal; and
   wherein rotating the first container about the second container causes the at least one cutter to move toward the film such that the at least one cutter pierces the film to create a compartment hole.

2. The drink container as in claim 1, wherein the cutter has a flat leading edge that extends radially from a center of the first container.

3. The drink container of claim 2, wherein the cutter has a T-shape.

4. The drink container of claim 3, wherein the tab is configured to prevent rotation of the upper container in an unscrewing first direction with respect to the lower container when the tab is positioned within the opening.

5. The drink container of claim 1, wherein the upper container further comprises:
   an upper orifice surrounded by a lip;
   threads formed on an outer perimeter surface of the lip;
   a strainer configured with a plurality of holes, the strainer covering the upper orifice; and
   a cap having a threaded interior perimeter configured to mate with the threads of the lip.

6. The drink container of claim 1, wherein the upper container forms a mixing void between a top surface of the film and a bottom surface of the strainer, the mixing void providing a volume for intermixing the contents of the lower container.

7. The drink container of claim 1, further comprising a gasket between the lower container and the upper container.

8. The drink container of claim 1, wherein the tab is accepted into the opening by the tab moving towards a central axis of the drink container.

* * * * *